United States Patent
Neppalli et al.

(10) Patent No.: US 9,875,055 B1
(45) Date of Patent: Jan. 23, 2018

(54) CHECK-POINTING OF METADATA

(71) Applicant: Western Digital Technologies, Inc., Irvine, CA (US)

(72) Inventors: Srinivas Neppalli, Irvine, CA (US); Raymond Yu, Westminster, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 666 days.

(21) Appl. No.: 14/451,115

(22) Filed: Aug. 4, 2014

(51) Int. Cl.
*G06F 3/06* (2006.01)

(52) U.S. Cl.
CPC ............ *G06F 3/064* (2013.01); *G06F 3/0604* (2013.01); *G06F 3/0656* (2013.01); *G06F 3/0674* (2013.01); *G06F 2003/0695* (2013.01)

(58) Field of Classification Search
None
See application file for complete search history.

(56) References Cited

U.S. PATENT DOCUMENTS

| | | | | |
|---|---|---|---|---|
| 4,769,770 | A | † | 9/1988 | Miyadera et al. |
| 5,613,066 | A | † | 3/1997 | Matsushima et al. |
| 6,018,789 | A | † | 1/2000 | Sokolov et al. |
| 6,065,095 | A | † | 5/2000 | Sokolov et al. |
| 6,078,452 | A | † | 6/2000 | Kittilson et al. |
| 6,081,447 | A | † | 6/2000 | Lofgren et al. |
| 6,092,149 | A | † | 7/2000 | Hicken et al. |
| 6,092,150 | A | † | 7/2000 | Sokolov et al. |
| 6,092,231 | A | † | 7/2000 | Sze |
| 6,094,707 | A | † | 7/2000 | Sokolov et al. |
| 6,105,104 | A | † | 8/2000 | Guttmann et al. |
| 6,111,717 | A | † | 8/2000 | Cloke et al. |
| 6,145,052 | A | † | 11/2000 | Howe et al. |
| 6,175,893 | B1 | † | 1/2001 | D'Souza et al. |
| 6,178,056 | B1 | † | 1/2001 | Cloke et al. |
| 6,191,909 | B1 | † | 2/2001 | Cloke et al. |
| 6,195,218 | B1 | † | 2/2001 | Guttmann et al. |
| 6,202,121 | B1 | † | 3/2001 | Walsh et al. |
| 6,205,494 | B1 | † | 3/2001 | Williams |
| 6,208,477 | B1 | † | 3/2001 | Cloke et al. |
| 6,223,303 | B1 | † | 4/2001 | Billings et al. |
| 6,230,233 | B1 | † | 5/2001 | Lofgren et al. |
| 6,246,346 | B1 | † | 6/2001 | Cloke et al. |

(Continued)

FOREIGN PATENT DOCUMENTS

WO     2009102425 A1  †  8/2009

OTHER PUBLICATIONS

Rosenblum, "The Design and Implementation of a Log-structured File System", EECS Department, University of California, Berkeley, Technical Report No. UCB/CSD-92-696, Jun. 1992.†

(Continued)

*Primary Examiner* — Ann J Lo
*Assistant Examiner* — Leandro Villanueva
(74) *Attorney, Agent, or Firm* — Barry IP Law

(57) ABSTRACT

Managing data stored in a Data Storage Device (DSD) including a volatile memory and a non-volatile memory including a circular buffer. Metadata stored in the volatile memory is logically divided into blocks of metadata. At least one changed block of metadata is identified that has changed during operation of the DSD and the at least one changed block of metadata is stored in the circular buffer of the non-volatile memory.

21 Claims, 4 Drawing Sheets

(56) References Cited

U.S. PATENT DOCUMENTS

| | | | |
|---|---|---|---|
| 6,249,393 B1 † | 6/2001 | Billings et al. |
| 6,256,695 B1 † | 7/2001 | Williams |
| 6,262,857 B1 † | 7/2001 | Hull et al. |
| 6,263,459 B1 † | 7/2001 | Schibilla |
| 6,272,694 B1 † | 8/2001 | Weaver et al. |
| 6,278,568 B1 † | 8/2001 | Cloke et al. |
| 6,279,089 B1 † | 8/2001 | Schibilla et al. |
| 6,289,484 B1 † | 9/2001 | Rothberg et al. |
| 6,292,912 B1 † | 9/2001 | Cloke et al. |
| 6,310,740 B1 † | 10/2001 | Dunbar et al. |
| 6,317,850 B1 † | 11/2001 | Rothberg |
| 6,324,604 B1 † | 11/2001 | Don et al. |
| 6,327,106 B1 † | 12/2001 | Rothberg |
| 6,337,778 B1 † | 1/2002 | Gagne |
| 6,339,811 B1 † | 1/2002 | Gaertner et al. |
| 6,369,969 B1 † | 4/2002 | Christiansen et al. |
| 6,384,999 B1 † | 5/2002 | Schibilla |
| 6,388,833 B1 † | 5/2002 | Golowka et al. |
| 6,405,342 B1 † | 6/2002 | Lee |
| 6,408,357 B1 † | 6/2002 | Hanmann et al. |
| 6,408,406 B1 † | 6/2002 | Parris |
| 6,411,452 B1 † | 6/2002 | Cloke |
| 6,411,458 B1 † | 6/2002 | Billings et al. |
| 6,412,083 B1 † | 6/2002 | Rothberg et al. |
| 6,415,349 B1 † | 7/2002 | Hull et al. |
| 6,425,128 B1 † | 7/2002 | Krapf et al. |
| 6,441,981 B1 † | 8/2002 | Cloke et al. |
| 6,442,328 B1 † | 8/2002 | Elliott et al. |
| 6,445,524 B1 † | 9/2002 | Nazarian et al. |
| 6,449,767 B1 † | 9/2002 | Krapf et al. |
| 6,453,115 B1 † | 9/2002 | Boyle |
| 6,470,420 B1 † | 10/2002 | Hospodor |
| 6,480,020 B1 † | 11/2002 | Jung et al. |
| 6,480,349 B1 † | 11/2002 | Kim et al. |
| 6,480,932 B1 † | 11/2002 | Vallis et al. |
| 6,483,986 B1 † | 11/2002 | Krapf |
| 6,487,032 B1 † | 11/2002 | Cloke et al. |
| 6,490,635 B1 † | 12/2002 | Holmes |
| 6,493,173 B1 † | 12/2002 | Kim et al. |
| 6,499,083 B1 † | 12/2002 | Hamlin |
| 6,519,104 B1 † | 2/2003 | Cloke et al. |
| 6,525,892 B1 † | 2/2003 | Dunbar et al. |
| 6,545,830 B1 † | 4/2003 | Briggs et al. |
| 6,546,489 B1 † | 4/2003 | Frank, Jr. et al |
| 6,550,021 B1 † | 4/2003 | Dalphy et al. |
| 6,552,880 B1 † | 4/2003 | Dunbar et al. |
| 6,553,457 B1 † | 4/2003 | Wilkins et al. |
| 6,574,774 B1 † | 6/2003 | Vasiliev |
| 6,578,106 B1 † | 6/2003 | Price |
| 6,580,573 B1 † | 6/2003 | Hull et al. |
| 6,594,183 B1 † | 7/2003 | Lofgren et al. |
| 6,600,620 B1 † | 7/2003 | Krounbi et al. |
| 6,601,137 B1 † | 7/2003 | Castro et al. |
| 6,603,622 B1 † | 8/2003 | Christiansen et al. |
| 6,603,625 B1 † | 8/2003 | Hospodor et al. |
| 6,604,220 B1 † | 8/2003 | Lee |
| 6,606,682 B1 † | 8/2003 | Dang et al. |
| 6,606,714 B1 † | 8/2003 | Thelin |
| 6,606,717 B1 † | 8/2003 | Yu et al. |
| 6,611,393 B1 † | 8/2003 | Nguyen et al. |
| 6,615,312 B1 † | 9/2003 | Hamlin et al. |
| 6,639,748 B1 † | 10/2003 | Christiansen et al. |
| 6,647,481 B1 † | 11/2003 | Luu et al. |
| 6,654,193 B1 † | 11/2003 | Thelin |
| 6,657,810 B1 † | 12/2003 | Kupferman |
| 6,661,591 B1 † | 12/2003 | Rothberg |
| 6,665,772 B1 † | 12/2003 | Hamlin |
| 6,687,073 B1 † | 2/2004 | Kupferman |
| 6,687,078 B1 † | 2/2004 | Kim |
| 6,687,850 B1 † | 2/2004 | Rothberg |
| 6,690,523 B1 † | 2/2004 | Nguyen et al. |
| 6,690,882 B1 † | 2/2004 | Hanmann et al. |
| 6,691,198 B1 † | 2/2004 | Hamlin |
| 6,691,213 B1 † | 2/2004 | Luu et al. |
| 6,691,255 B1 † | 2/2004 | Rothberg et al. |
| 6,693,760 B1 † | 2/2004 | Krounbi et al. |
| 6,694,477 B1 † | 2/2004 | Lee |
| 6,697,914 B1 † | 2/2004 | Hospodor et al. |
| 6,704,153 B1 † | 3/2004 | Rothberg et al. |
| 6,708,251 B1 † | 3/2004 | Boyle et al. |
| 6,710,951 B1 † | 3/2004 | Cloke |
| 6,711,628 B1 † | 3/2004 | Thelin |
| 6,711,635 B1 † | 3/2004 | Wang |
| 6,711,660 B1 † | 3/2004 | Milne et al. |
| 6,715,044 B2 † | 3/2004 | Lofgren et al. |
| 6,724,982 B1 † | 4/2004 | Hamlin |
| 6,725,329 B1 † | 4/2004 | Ng et al. |
| 6,735,650 B1 † | 5/2004 | Rothberg |
| 6,735,693 B1 † | 5/2004 | Hamlin |
| 6,744,772 B1 † | 6/2004 | Eneboe et al. |
| 6,745,283 B1 † | 6/2004 | Dang |
| 6,751,402 B1 † | 6/2004 | Elliott et al. |
| 6,757,481 B1 † | 6/2004 | Nazarian et al. |
| 6,772,274 B1 † | 8/2004 | Estakhri |
| 6,772,281 B2 † | 8/2004 | Hamlin |
| 6,781,826 B1 † | 8/2004 | Goldstone et al. |
| 6,782,449 B1 † | 8/2004 | Codilian et al. |
| 6,791,779 B1 † | 9/2004 | Singh et al. |
| 6,792,486 B1 † | 9/2004 | Hanan et al. |
| 6,799,274 B1 † | 9/2004 | Hamlin |
| 6,811,427 B2 † | 11/2004 | Garrett et al. |
| 6,826,003 B1 † | 11/2004 | Subrahmanyam |
| 6,826,614 B1 † | 11/2004 | Hanmann et al. |
| 6,829,688 B2 † | 12/2004 | Grubbs et al. |
| 6,832,041 B1 † | 12/2004 | Boyle |
| 6,832,929 B2 † | 12/2004 | Garrett et al. |
| 6,845,405 B1 † | 1/2005 | Thelin |
| 6,845,427 B1 † | 1/2005 | Atai-Azimi |
| 6,850,443 B2 † | 2/2005 | Lofgren et al. |
| 6,851,055 B1 † | 2/2005 | Boyle et al. |
| 6,851,063 B1 † | 2/2005 | Boyle et al. |
| 6,853,731 B1 † | 2/2005 | Boyle et al. |
| 6,854,022 B1 † | 2/2005 | Thelin |
| 6,862,660 B1 † | 3/2005 | Wilkins et al. |
| 6,880,043 B1 † | 4/2005 | Castro et al. |
| 6,882,486 B1 † | 4/2005 | Kupferman |
| 6,884,085 B1 † | 4/2005 | Goldstone |
| 6,886,068 B2 † | 4/2005 | Tomita |
| 6,888,831 B1 † | 5/2005 | Hospodor et al. |
| 6,892,217 B1 † | 5/2005 | Hanmann et al. |
| 6,892,249 B1 † | 5/2005 | Codilian et al. |
| 6,892,313 B1 † | 5/2005 | Codilian et al. |
| 6,895,455 B1 † | 5/2005 | Rothberg |
| 6,895,468 B2 † | 5/2005 | Rege et al. |
| 6,895,500 B1 † | 5/2005 | Rothberg |
| 6,898,730 B1 † | 5/2005 | Hanan |
| 6,901,479 B2 † | 5/2005 | Tomita |
| 6,910,099 B1 † | 6/2005 | Wang et al. |
| 6,920,455 B1 † | 7/2005 | Weschler |
| 6,928,470 B1 † | 8/2005 | Hamlin |
| 6,931,439 B1 † | 8/2005 | Hanmann et al. |
| 6,934,104 B1 † | 8/2005 | Kupferman |
| 6,934,713 B2 † | 8/2005 | Schwartz et al. |
| 6,940,873 B2 † | 9/2005 | Boyle et al. |
| 6,943,978 B1 † | 9/2005 | Lee |
| 6,948,165 B1 † | 9/2005 | Luu et al. |
| 6,950,267 B1 † | 9/2005 | Liu et al. |
| 6,954,733 B1 † | 10/2005 | Ellis et al. |
| 6,961,814 B1 † | 11/2005 | Thelin et al. |
| 6,965,489 B1 † | 11/2005 | Lee et al. |
| 6,965,563 B1 † | 11/2005 | Hospodor et al. |
| 6,965,966 B1 † | 11/2005 | Rothberg et al. |
| 6,967,799 B1 † | 11/2005 | Lee |
| 6,967,810 B2 † | 11/2005 | Kasiraj et al. |
| 6,968,422 B1 † | 11/2005 | Codilian et al. |
| 6,968,450 B1 † | 11/2005 | Rothberg et al. |
| 6,973,495 B1 † | 12/2005 | Milne et al. |
| 6,973,570 B1 † | 12/2005 | Hamlin |
| 6,976,190 B1 † | 12/2005 | Goldstone |
| 6,983,316 B1 † | 1/2006 | Milne et al. |
| 6,986,007 B1 † | 1/2006 | Procyk et al. |
| 6,986,154 B1 † | 1/2006 | Price et al. |
| 6,995,933 B1 † | 2/2006 | Codilian et al. |
| 6,996,501 B1 † | 2/2006 | Rothberg |

(56) References Cited

U.S. PATENT DOCUMENTS

| | | | |
|---|---|---|---|
| 6,996,669 B1 † | 2/2006 | Dang et al. |
| 7,002,926 B1 † | 2/2006 | Eneboe et al. |
| 7,003,674 B1 † | 2/2006 | Hamlin |
| 7,006,316 B1 † | 2/2006 | Sargenti, Jr. et al. |
| 7,009,820 B1 † | 3/2006 | Hogg |
| 7,023,639 B1 † | 4/2006 | Kupferman |
| 7,024,491 B1 † | 4/2006 | Hanmann et al. |
| 7,024,549 B1 † | 4/2006 | Luu et al. |
| 7,024,614 B1 † | 4/2006 | Thelin et al. |
| 7,027,716 B1 † | 4/2006 | Boyle et al. |
| 7,028,174 B1 † | 4/2006 | Atai-Azimi et al. |
| 7,031,902 B1 † | 4/2006 | Catiller |
| 7,046,465 B1 † | 5/2006 | Kupferman |
| 7,046,488 B1 † | 5/2006 | Hogg |
| 7,050,252 B1 † | 5/2006 | Vallis |
| 7,054,937 B1 † | 5/2006 | Milne et al. |
| 7,055,000 B1 † | 5/2006 | Severtson |
| 7,055,167 B1 † | 5/2006 | Masters |
| 7,057,836 B1 † | 6/2006 | Kupferman |
| 7,062,398 B1 † | 6/2006 | Rothberg |
| 7,075,746 B1 † | 7/2006 | Kupferman |
| 7,076,604 B1 † | 7/2006 | Thelin |
| 7,082,494 B1 † | 7/2006 | Thelin et al. |
| 7,088,538 B1 † | 8/2006 | Codilian et al. |
| 7,088,545 B1 † | 8/2006 | Singh et al. |
| 7,092,186 B1 † | 8/2006 | Hogg |
| 7,095,577 B1 † | 8/2006 | Codilian et al. |
| 7,099,095 B1 † | 8/2006 | Subrahmanyam et al. |
| 7,106,537 B1 † | 9/2006 | Bennett |
| 7,106,947 B2 † | 9/2006 | Boyle et al. |
| 7,110,202 B1 † | 9/2006 | Vasquez |
| 7,111,116 B1 † | 9/2006 | Boyle et al. |
| 7,114,029 B1 † | 9/2006 | Thelin |
| 7,120,737 B1 † | 10/2006 | Thelin |
| 7,120,806 B1 † | 10/2006 | Codilian et al. |
| 7,126,776 B1 † | 10/2006 | Warren, Jr. et al. |
| 7,129,763 B1 † | 10/2006 | Bennett et al. |
| 7,133,600 B1 † | 11/2006 | Boyle |
| 7,136,244 B1 † | 11/2006 | Rothberg |
| 7,146,094 B1 † | 12/2006 | Boyle |
| 7,149,046 B1 † | 12/2006 | Coker et al. |
| 7,150,036 B1 † | 12/2006 | Milne et al. |
| 7,155,448 B2 † | 12/2006 | Winter |
| 7,155,616 B1 † | 12/2006 | Hamlin |
| 7,171,108 B1 † | 1/2007 | Masters et al. |
| 7,171,110 B1 † | 1/2007 | Wilshire |
| 7,194,576 B1 † | 3/2007 | Boyle et al. |
| 7,200,698 B1 † | 4/2007 | Rothberg |
| 7,205,805 B1 † | 4/2007 | Bennett |
| 7,206,497 B1 † | 4/2007 | Boyle et al. |
| 7,215,496 B1 † | 5/2007 | Kupferman et al. |
| 7,215,771 B1 † | 5/2007 | Hamlin |
| 7,237,054 B1 † | 6/2007 | Cain et al. |
| 7,240,161 B1 † | 7/2007 | Boyle |
| 7,249,365 B1 † | 7/2007 | Price et al. |
| 7,263,709 B1 † | 8/2007 | Krapf |
| 7,274,639 B1 † | 9/2007 | Codilian et al. |
| 7,274,659 B2 † | 9/2007 | Hospodor |
| 7,275,116 B1 † | 9/2007 | Hanmann et al. |
| 7,280,302 B1 † | 10/2007 | Masiewicz |
| 7,292,774 B1 † | 11/2007 | Masters et al. |
| 7,292,775 B1 † | 11/2007 | Boyle et al. |
| 7,296,284 B1 † | 11/2007 | Price et al. |
| 7,302,501 B1 † | 11/2007 | Cain et al. |
| 7,302,579 B1 † | 11/2007 | Cain et al. |
| 7,318,088 B1 † | 1/2008 | Mann |
| 7,319,806 B1 † | 1/2008 | Willner et al. |
| 7,325,244 B2 † | 1/2008 | Boyle et al. |
| 7,330,323 B1 † | 2/2008 | Singh et al. |
| 7,346,790 B1 † | 3/2008 | Klein |
| 7,366,641 B1 † | 4/2008 | Masiewicz et al. |
| 7,369,340 B1 † | 5/2008 | Dang et al. |
| 7,369,343 B1 † | 5/2008 | Yeo et al. |
| 7,372,650 B1 † | 5/2008 | Kupferman |
| 7,380,147 B1 † | 5/2008 | Sun |
| 7,392,340 B1 † | 6/2008 | Dang et al. |
| 7,404,013 B1 † | 7/2008 | Masiewicz |
| 7,406,545 B1 † | 7/2008 | Rothberg et al. |
| 7,412,585 B2 † | 8/2008 | Uemura |
| 7,415,571 B1 † | 8/2008 | Hanan |
| 7,436,610 B1 † | 10/2008 | Thelin |
| 7,437,502 B1 † | 10/2008 | Coker |
| 7,440,214 B1 † | 10/2008 | Ell et al. |
| 7,451,344 B1 † | 11/2008 | Rothberg |
| 7,471,483 B1 † | 12/2008 | Ferris et al. |
| 7,471,486 B1 † | 12/2008 | Coker et al. |
| 7,486,060 B1 † | 2/2009 | Bennett |
| 7,486,460 B2 † | 2/2009 | Tsuchinaga et al. |
| 7,490,212 B2 † | 2/2009 | Kasiraj et al. |
| 7,496,493 B1 † | 2/2009 | Stevens |
| 7,509,471 B2 † | 3/2009 | Gorobets |
| 7,516,267 B2 † | 4/2009 | Coulson et al. |
| 7,518,819 B1 † | 4/2009 | Yu et al. |
| 7,526,184 B1 † | 4/2009 | Parkinen et al. |
| 7,529,880 B2 † | 5/2009 | Chung et al. |
| 7,539,924 B1 † | 5/2009 | Vasquez et al. |
| 7,543,117 B1 † | 6/2009 | Hanan |
| 7,551,383 B1 † | 6/2009 | Kupferman |
| 7,562,282 B1 † | 7/2009 | Rothberg |
| 7,577,973 B1 † | 8/2009 | Kapner, III et al. |
| 7,596,797 B1 † | 9/2009 | Kapner, III et al. |
| 7,599,139 B1 † | 10/2009 | Bombet et al. |
| 7,603,530 B1 † | 10/2009 | Liikanen et al. |
| 7,619,841 B1 † | 11/2009 | Kupferman |
| 7,647,544 B1 † | 1/2010 | Masiewicz |
| 7,649,704 B1 † | 1/2010 | Bombet et al. |
| 7,653,927 B1 † | 1/2010 | Kapner et al. |
| 7,656,603 B1 † | 2/2010 | Xing |
| 7,656,763 B1 † | 2/2010 | Jin et al. |
| 7,657,149 B2 † | 2/2010 | Boyle |
| 7,669,044 B2 † | 2/2010 | Fitzgerald et al. |
| 7,672,072 B1 † | 3/2010 | Boyle et al. |
| 7,673,075 B1 † | 3/2010 | Masiewicz |
| 7,685,360 B1 † | 3/2010 | Brunnett et al. |
| 7,688,540 B1 † | 3/2010 | Mei et al. |
| 7,724,461 B1 † | 5/2010 | McFadyen et al. |
| 7,725,584 B1 † | 5/2010 | Hanmann et al. |
| 7,730,295 B1 † | 6/2010 | Lee |
| 7,760,458 B1 † | 7/2010 | Trinh |
| 7,768,776 B1 † | 8/2010 | Szeremeta et al. |
| 7,804,657 B1 † | 9/2010 | Hogg et al. |
| 7,813,954 B1 † | 10/2010 | Price et al. |
| 7,827,320 B1 † | 11/2010 | Stevens |
| 7,839,588 B1 † | 11/2010 | Dang et al. |
| 7,840,878 B1 † | 11/2010 | Tang et al. |
| 7,843,660 B1 † | 11/2010 | Yeo |
| 7,852,596 B2 † | 12/2010 | Boyle et al. |
| 7,859,782 B1 † | 12/2010 | Lee |
| 7,872,822 B1 † | 1/2011 | Rothberg |
| 7,898,756 B1 † | 3/2011 | Wang |
| 7,898,762 B1 † | 3/2011 | Guo et al. |
| 7,900,037 B1 † | 3/2011 | Fallone et al. |
| 7,907,364 B2 † | 3/2011 | Boyle et al. |
| 7,929,234 B1 † | 4/2011 | Boyle et al. |
| 7,933,087 B1 † | 4/2011 | Tsai et al. |
| 7,933,090 B1 † | 4/2011 | Jung et al. |
| 7,934,030 B1 † | 4/2011 | Sargenti, Jr. et al. |
| 7,940,491 B2 † | 5/2011 | Szeremeta et al. |
| 7,944,639 B1 † | 5/2011 | Wang |
| 7,945,727 B2 † | 5/2011 | Rothberg et al. |
| 7,949,564 B1 † | 5/2011 | Hughes et al. |
| 7,974,029 B2 † | 7/2011 | Tsai et al. |
| 7,974,039 B1 † | 7/2011 | Xu et al. |
| 7,982,993 B1 † | 7/2011 | Tsai et al. |
| 7,984,200 B1 † | 7/2011 | Bombet et al. |
| 7,990,648 B1 † | 8/2011 | Wang |
| 7,992,179 B1 † | 8/2011 | Kepner, III et al. |
| 8,004,785 B1 † | 8/2011 | Tsai et al. |
| 8,006,027 B1 † | 8/2011 | Stevens et al. |
| 8,014,094 B1 † | 9/2011 | Jin |
| 8,014,977 B1 † | 9/2011 | Masiewicz et al. |
| 8,019,914 B1 † | 9/2011 | Vasquez et al. |
| 8,040,625 B1 † | 10/2011 | Boyle |
| 8,078,943 B1 † | 12/2011 | Lee |

(56) References Cited

U.S. PATENT DOCUMENTS

| | | | |
|---|---|---|---|
| 8,079,045 B2 † | 12/2011 | Krapf et al. |
| 8,082,433 B1 † | 12/2011 | Fallone |
| 8,085,487 B1 † | 12/2011 | Jung et al. |
| 8,089,719 B1 † | 1/2012 | Dakroub |
| 8,090,902 B1 † | 1/2012 | Bennett et al. |
| 8,090,906 B1 † | 1/2012 | Blaha et al. |
| 8,091,112 B1 † | 1/2012 | Elliott |
| 8,094,396 B1 † | 1/2012 | Zhang et al. |
| 8,094,401 B1 † | 1/2012 | Peng et al. |
| 8,116,020 B1 † | 2/2012 | Lee |
| 8,116,025 B1 † | 2/2012 | Chan et al. |
| 8,134,793 B1 † | 3/2012 | Vasquez et al. |
| 8,134,798 B1 † | 3/2012 | Thelin et al. |
| 8,139,301 B1 † | 3/2012 | Li et al. |
| 8,139,310 B1 † | 3/2012 | Hogg |
| 8,144,419 B1 † | 3/2012 | Liu |
| 8,145,452 B1 † | 3/2012 | Masiewicz et al. |
| 8,149,528 B1 † | 4/2012 | Suratman et al. |
| 8,154,812 B1 † | 4/2012 | Boyle et al. |
| 8,159,768 B1 † | 4/2012 | Miyamura |
| 8,161,328 B1 † | 4/2012 | Wilshire |
| 8,164,849 B1 † | 4/2012 | Szeremeta et al. |
| 8,174,780 B1 † | 5/2012 | Tsai et al. |
| 8,190,575 B1 † | 5/2012 | Ong et al. |
| 8,194,338 B1 † | 6/2012 | Zhang |
| 8,194,340 B1 † | 6/2012 | Boyle et al. |
| 8,194,341 B1 † | 6/2012 | Boyle |
| 8,201,066 B1 † | 6/2012 | Wang |
| 8,271,692 B1 † | 9/2012 | Dinh et al. |
| 8,279,550 B1 † | 10/2012 | Hogg |
| 8,281,218 B1 † | 10/2012 | Ybarra et al. |
| 8,285,923 B2 † | 10/2012 | Stevens |
| 8,289,656 B1 † | 10/2012 | Huber |
| 8,305,705 B1 † | 11/2012 | Roohr |
| 8,307,156 B1 † | 11/2012 | Codilian et al. |
| 8,310,775 B1 † | 11/2012 | Boguslawski et al. |
| 8,315,006 B1 † | 11/2012 | Chahwan et al. |
| 8,316,263 B1 † | 11/2012 | Gough et al. |
| 8,320,067 B1 † | 11/2012 | Tsai et al. |
| 8,324,974 B1 † | 12/2012 | Bennett |
| 8,332,695 B2 † | 12/2012 | Dalphy et al. |
| 8,341,337 B1 † | 12/2012 | Ong et al. |
| 8,350,628 B1 † | 1/2013 | Bennett |
| 8,356,184 B1 † | 1/2013 | Meyer et al. |
| 8,370,683 B1 † | 2/2013 | Ryan et al. |
| 8,375,225 B1 † | 2/2013 | Ybarra |
| 8,375,274 B1 † | 2/2013 | Bonke |
| 8,380,922 B1 † | 2/2013 | DeForest et al. |
| 8,390,948 B2 † | 3/2013 | Hogg |
| 8,390,952 B1 † | 3/2013 | Szeremeta |
| 8,392,689 B1 † | 3/2013 | Lott |
| 8,407,393 B1 † | 3/2013 | Yolar et al. |
| 8,413,010 B1 † | 4/2013 | Vasquez et al. |
| 8,417,566 B2 † | 4/2013 | Price et al. |
| 8,421,663 B1 † | 4/2013 | Bennett |
| 8,422,172 B1 † | 4/2013 | Dakroub et al. |
| 8,427,771 B1 † | 4/2013 | Tsai |
| 8,429,343 B1 † | 4/2013 | Tsai |
| 8,433,937 B1 † | 4/2013 | Wheelock et al. |
| 8,433,977 B1 † | 4/2013 | Vasquez et al. |
| 8,443,167 B1 † | 5/2013 | Fallone et al. |
| 8,458,526 B2 † | 6/2013 | Dalphy et al. |
| 8,462,466 B2 † | 6/2013 | Huber |
| 8,467,151 B1 † | 6/2013 | Huber |
| 8,489,841 B1 † | 7/2013 | Strecke et al. |
| 8,493,679 B1 † | 7/2013 | Boguslawski et al. |
| 8,498,074 B1 † | 7/2013 | Mobley et al. |
| 8,499,198 B1 † | 7/2013 | Messenger et al. |
| 8,512,049 B1 † | 8/2013 | Huber et al. |
| 8,514,506 B1 † | 8/2013 | Li et al. |
| 8,531,791 B1 † | 9/2013 | Reid et al. |
| 8,554,741 B1 † | 10/2013 | Malina |
| 8,560,759 B1 † | 10/2013 | Boyle ete al. |
| 8,565,053 B1 † | 10/2013 | Chung |
| 8,576,511 B1 † | 11/2013 | Coker et al. |
| 8,578,100 B1 † | 11/2013 | Huynh et al. |
| 8,578,242 B1 † | 11/2013 | Burton et al. |
| 8,589,773 B1 † | 11/2013 | Wang et al. |
| 8,593,753 B1 † | 11/2013 | Anderson |
| 8,595,432 B1 † | 11/2013 | Vinson et al. |
| 8,599,510 B1 † | 12/2013 | Fallone |
| 8,601,248 B2 † | 12/2013 | Thorsted |
| 8,611,032 B2 † | 12/2013 | Champion et al. |
| 8,612,650 B1 † | 12/2013 | Carrie et al. |
| 8,612,706 B1 † | 12/2013 | Madril et al. |
| 8,612,798 B1 † | 12/2013 | Tsai |
| 8,619,383 B1 † | 12/2013 | Jung et al. |
| 8,621,115 B1 † | 12/2013 | Bombet et al. |
| 8,621,133 B1 † | 12/2013 | Boyle |
| 8,626,463 B2 † | 1/2014 | Stevens et al. |
| 8,630,052 B1 † | 1/2014 | Jung et al. |
| 8,630,056 B1 † | 1/2014 | Ong |
| 8,631,188 B1 † | 1/2014 | Heath et al. |
| 8,631,197 B2 † | 1/2014 | Hall |
| 8,634,158 B1 † | 1/2014 | Chahwan et al. |
| 8,635,412 B1 † | 1/2014 | Wilshire |
| 8,640,007 B1 † | 1/2014 | Schulze |
| 8,654,619 B1 † | 2/2014 | Cheng |
| 8,661,193 B1 † | 2/2014 | Cobos et al. |
| 8,667,248 B1 † | 3/2014 | Neppalli |
| 8,670,205 B1 † | 3/2014 | Malina et al. |
| 8,683,295 B1 † | 3/2014 | Syu et al. |
| 8,683,457 B1 † | 3/2014 | Hughes et al. |
| 8,687,306 B1 † | 4/2014 | Coker et al. |
| 8,693,133 B1 † | 4/2014 | Lee et al. |
| 8,694,841 B1 † | 4/2014 | Chung et al. |
| 8,699,159 B1 † | 4/2014 | Malina |
| 8,699,171 B1 † | 4/2014 | Boyle |
| 8,699,172 B1 † | 4/2014 | Gunderson et al. |
| 8,699,175 B1 † | 4/2014 | Olds et al. |
| 8,699,185 B1 † | 4/2014 | Teh et al. |
| 8,700,850 B1 † | 4/2014 | Lalouette |
| 8,743,502 B1 † | 6/2014 | Bonke et al. |
| 8,749,910 B1 † | 6/2014 | Dang et al. |
| 8,751,699 B1 † | 6/2014 | Tsai et al. |
| 8,755,141 B1 † | 6/2014 | Dang |
| 8,755,143 B2 † | 6/2014 | Wilson et al. |
| 8,756,361 B1 † | 6/2014 | Pruett et al. |
| 8,756,382 B1 † | 6/2014 | Carlson et al. |
| 8,769,593 B1 † | 7/2014 | Elliott et al. |
| 8,773,802 B1 † | 7/2014 | Anderson et al. |
| 8,780,478 B1 † | 7/2014 | Huynh et al. |
| 8,782,334 B1 † | 7/2014 | Boyle et al. |
| 8,793,429 B1 † | 7/2014 | Call et al. |
| 8,793,532 B1 † | 7/2014 | Tsai et al. |
| 8,797,669 B1 † | 8/2014 | Burton et al. |
| 8,799,977 B1 † | 8/2014 | Kapner, III et al. |
| 8,856,438 B1 † | 10/2014 | Warner et al. |
| 9,563,397 B1 * | 2/2017 | Stoev .................. G06F 5/10 |
| 2004/0019718 A1 † | 1/2004 | Schauer et al. |
| 2004/0109376 A1 † | 6/2004 | Lin |
| 2005/0071537 A1 † | 3/2005 | New et al. |
| 2005/0071593 A1 * | 3/2005 | Vincent ............... G06F 11/1471 |
| | | | 711/165 |
| 2005/0144517 A1 † | 6/2005 | Zayas |
| 2006/0090030 A1 † | 4/2006 | Ljdens et al. |
| 2006/0112138 A1 † | 5/2006 | Fenske et al. |
| 2006/0117161 A1 † | 6/2006 | Venturi |
| 2006/0181993 A1 † | 8/2006 | Blacquiere et al. |
| 2007/0016721 A1 † | 1/2007 | Gay |
| 2007/0067603 A1 † | 3/2007 | Yamamoto et al. |
| 2007/0204100 A1 † | 8/2007 | Shin et al. |
| 2007/0226394 A1 † | 9/2007 | Noble |
| 2007/0245064 A1 † | 10/2007 | Liu |
| 2007/0288686 A1 † | 12/2007 | Arcedera et al. |
| 2007/0294589 A1 † | 12/2007 | Jarvis et al. |
| 2008/0098195 A1 † | 4/2008 | Cheon et al. |
| 2008/0104308 A1 † | 5/2008 | Mo et al. |
| 2008/0183955 A1 † | 7/2008 | Yang et al. |
| 2008/0195801 A1 † | 8/2008 | Cheon et al. |
| 2008/0256287 A1 † | 10/2008 | Lee et al. |
| 2008/0256295 A1 † | 10/2008 | Lambert et al. |
| 2008/0270680 A1 † | 10/2008 | Chang |
| 2008/0307192 A1 † | 12/2008 | Sinclair |

(56) References Cited

U.S. PATENT DOCUMENTS

| | | | |
|---|---|---|---|
| 2009/0019218 A1† | 1/2009 | Sinclair et al. | |
| 2009/0043985 A1† | 2/2009 | Tuuk et al. | |
| 2009/0055620 A1† | 2/2009 | Feldman et al. | |
| 2009/0063548 A1† | 3/2009 | Rusher et al. | |
| 2009/0113702 A1† | 5/2009 | Hogg | |
| 2009/0119353 A1† | 5/2009 | Oh et al. | |
| 2009/0150599 A1* | 6/2009 | Bennett | G06F 11/1441 711/103 |
| 2009/0154254 A1† | 6/2009 | Wong et al. | |
| 2009/0164535 A1† | 6/2009 | Gandhi | |
| 2009/0164696 A1† | 6/2009 | Allen | |
| 2009/0187732 A1† | 7/2009 | Greiner et al. | |
| 2009/0193184 A1† | 7/2009 | Yu et al. | |
| 2009/0198952 A1† | 8/2009 | Khmelnitsky et al. | |
| 2009/0204750 A1† | 8/2009 | Estakhri et al. | |
| 2009/0222643 A1† | 9/2009 | Chu | |
| 2009/0240873 A1† | 9/2009 | Yu et al. | |
| 2009/0276604 A1† | 11/2009 | Baird | |
| 2010/0011275 A1† | 1/2010 | Yang | |
| 2010/0049926 A1* | 2/2010 | Fuente | G06F 11/2087 711/162 |
| 2010/0049927 A1* | 2/2010 | Fuente | G06F 11/2087 711/162 |
| 2010/0061150 A1† | 3/2010 | Wu et al. | |
| 2010/0161881 A1† | 6/2010 | Nagadomi et al. | |
| 2010/0169543 A1† | 7/2010 | Edgington et al. | |
| 2010/0169551 A1† | 7/2010 | Yano et al. | |
| 2010/0208385 A1† | 8/2010 | Toukairin | |
| 2010/0306551 A1† | 12/2010 | Meyer et al. | |
| 2011/0226729 A1† | 9/2011 | Hogg | |
| 2012/0159042 A1† | 6/2012 | Lott et al. | |
| 2012/0275050 A1† | 11/2012 | Wilson et al. | |
| 2012/0281963 A1† | 11/2012 | Krapf et al. | |
| 2012/0303928 A1* | 11/2012 | Hall | G11B 5/012 711/172 |
| 2012/0324980 A1† | 12/2012 | Nguyen et al. | |
| 2014/0019680 A1* | 1/2014 | Jin | G11B 5/012 711/112 |
| 2014/0372380 A1* | 12/2014 | Brion, Jr. | G06F 17/30191 707/648 |

OTHER PUBLICATIONS

Mendel Rosenblum, John K. Ousterhout, "The Design and Implementation of a Log-Structured File System", University of California, ACM Transactions on Computer Systems, Feb. 1992, pp. 26-52, vol. 10, No. 1, Berkeley, California.†

Amer, et al., "Design Issues for a Shingled Write Disk System", 26th IEEE Symposium on Massive Storage Systems and Technologies: Research Track (MSST 2010), May 2010, 12 pages.†

David M. Hamilton, et al., U.S. Appl. No. 14/335,539, filed Jul. 18, 2014, 21 pages.†

David C. Pruett, et al., U.S. Appl. No. 12/895,855, filed Oct. 1, 2010, 27 pages.†

Robert M. Fallone, et al., U.S. Appl. No. 13/027,432, filed Feb. 15, 2011, 22 pages.†

\* cited by examiner
† cited by third party

| Block | LBAs x 10⁶ | Flag |
|---|---|---|
| A | 0 – 99 | 0 |
| B | 100 – 199 | 1 |
| C | 200 – 299 | 0 |
| D | 300 – 399 | 0 |
| E | 400 – 499 | 1 |
| F | 500 – 599 | 1 |
| G | 600 – 699 | 0 |
| H | 700 – 799 | 0 |

CHECK-POINTING OF METADATA

BACKGROUND

Data Storage Devices (DSDs) are used to record data onto or to reproduce data from a storage media. Metadata such as a translation table is often used by a DSD to keep track of a current location of data by mapping a logical address for the data to a physical address where the data is stored in the DSD.

The translation table is typically stored in a volatile memory to allow quick access to the translation table. In such an arrangement, the translation table can be check-pointed or stored to a non-volatile memory so that it is available across power cycles of the DSD. However, given the generally increasing data capacity of today's DSDs, the size of metadata such as translation tables is increasing. As a result, the amount of space needed to store the metadata in non-volatile memory is greater and the amount of time it takes to check-point the metadata increases.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
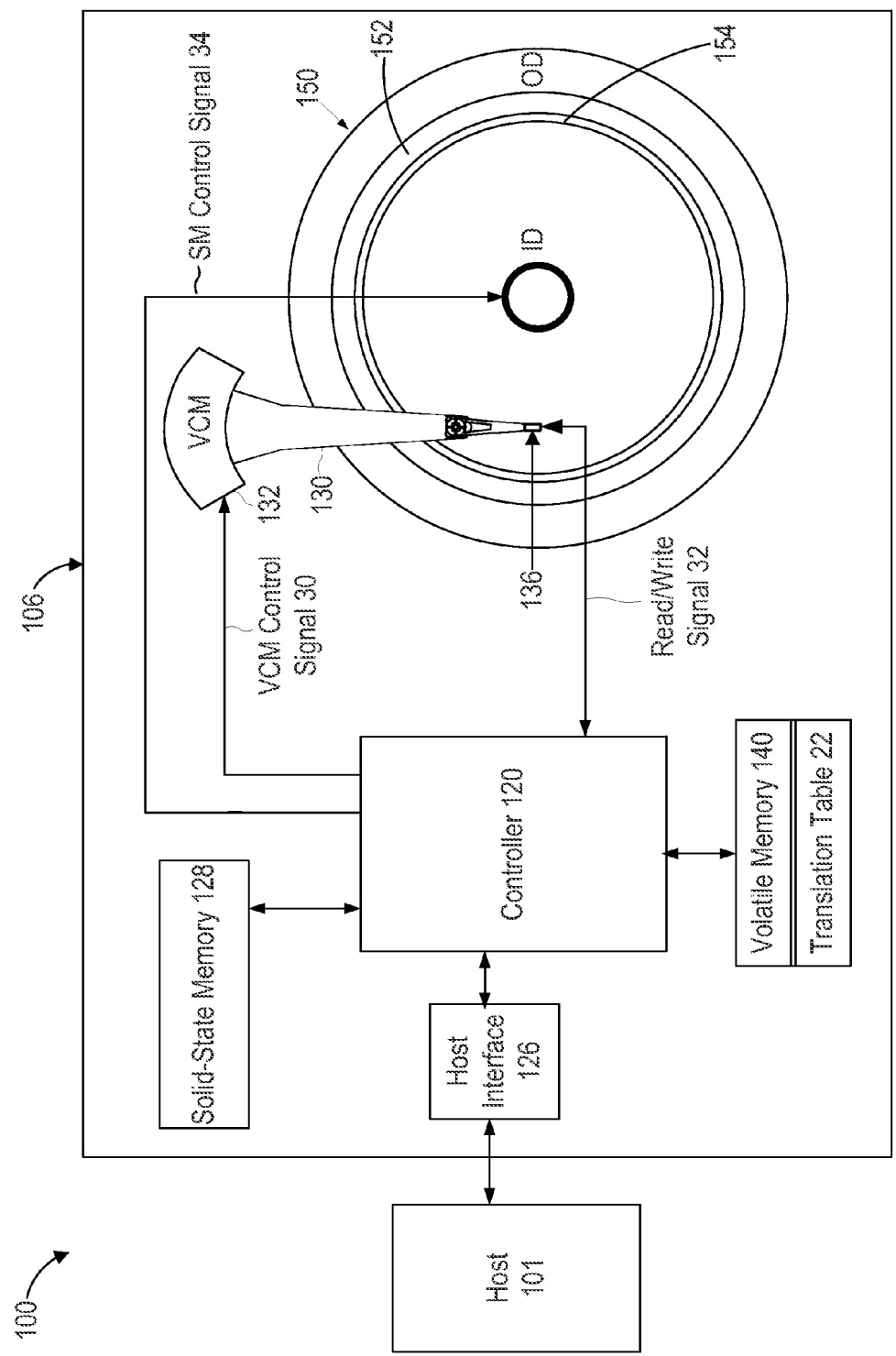
FIG. 1 is a block diagram depicting a Data Storage Device (DSD) according to an embodiment.

FIG. 1 shows system 100 according to an embodiment that includes host 101 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid-state memory 128 and disk 150 for storing data. In this regard, DSD 106 can be considered a Solid-state Hybrid Drive (SSHD) in that it includes both solid-state Non-Volatile Memory (NVM) media and disk NVM media. In other embodiments, each of disk 150 or solid-state memory 128 may be replaced by multiple Hard Disk Drives (HDDs) or multiple Solid-State Drives (SSDs), respectively, so that DSD 106 includes pools of HDDs or SSDs. In yet other embodiments, the NVM media of DSD 106 may only include disk 150 without solid-state memory 128.

DSD 106 includes controller 120 which comprises circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). As will be appreciated by those of ordinary skill in the art, host interface 126 can be included as part of controller 120.

In the example of FIG. 1, disk 150 is rotated by a spindle motor (not shown). DSD 106 also includes head 136 connected to the distal end of actuator 130, which is rotated by Voice Coil Motor (VCM) 132 to position head 136 in relation to disk 150. Controller 120 can control the position of head 136 and the rotation of disk 150 using VCM control signal 30 and SM control signal 34, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks (not shown) for storing data on a surface of disk 150 from an Inside Diameter (ID) portion to an Outside Diameter (OD) portion of disk 150. The tracks on disk 150 may be grouped together into zones of tracks with each track divided into a number of sectors that are spaced circumferentially along the tracks.

As shown in FIG. 1, disk 150 also includes circular buffer 152 and root area 154. As discussed below in more detail, circular buffer 152 can be used to store data objects or metadata that is updated during operation of DSD 106. The term "metadata" is used generally herein to include information related to operation of a storage media such as information about data stored in the storage media or information obtained during operation of the storage media. Metadata can, for example, indicate a location, structure, history, or contents of data stored in a storage media or can indicate an environmental condition or state of the storage media.

In some embodiments, disk 150 or portions of disk 150 can include Shingle Magnetic Recording (SMR). SMR has recently been introduced as a way of increasing the amount of data that can be stored in a given area on the disk by increasing the number of Tracks Per Inch (TPI) by overlapping tracks on the disk to result in narrow tracks at the non-overlapping portion of the tracks. Although SMR generally increases the recording density of the disk, SMR typically requires that the tracks are sequentially written since a new write to a previously overlapped track could also affect data in an adjacent track.

Due to the sequential writing of SMR, updates to previously written data are typically written in a new location rather than overwriting the previously written data in the same location. A translation table, such as translation table 22, can be used to keep track of a current location for the data since there may be several previous or obsolete versions of the data on disk 150.

Translation table 22 is stored in volatile memory 140 to allow quick access to translation table 22. As discussed in more detail below, translation table 22 is check-pointed or stored to non-volatile memory such as disk 150 or solid-state memory 128 so that it is available across power cycles of DSD 106.

However, due to the large size of translation table 22, it may take a significant amount of time to save it to non-volatile memory and may slow performance of host 101. To help address these concerns, the present disclosure provides for the storing of portions of metadata or blocks of metadata in circular buffer 152 that have changed since a previous check-point so as to ordinarily avoid having to check-point a large amount of metadata.

In addition, circular buffer 152 can utilize SMR to increase the amount of metadata that can be check-pointed to circular buffer 152. As noted above, SMR typically requires that tracks are sequentially written since a new write to a previously overlapped track could also affect data in an adjacent track. The data objects or metadata written in circular buffer 152 can be sequentially written toward one end of circular buffer 152 before wrapping back to the beginning of circular buffer 152 to overwrite previously written data objects and metadata.

This sequential writing of circular buffer 152 allows for the use of SMR in circular buffer 152 and therefore a greater space savings on disk 150 in storing data objects or metadata. In addition, the use of SMR in circular buffer 152 allows for circular buffer 152 to be treated similarly to other SMR zones on disk 150 without having to make additional accommodations for a zone of non-overlapping tracks using a conventional write-in-place policy.

Root area 154 stores mapping data identifying locations of the data objects or metadata stored in circular buffer 152. In other embodiments, the location of circular buffer 152 and root area 154 may differ from the locations shown in FIG. 1. For example, circular buffer 152 and root area may be stored more towards an OD or ID portion of disk 150.

In the embodiment of FIG. 1, root area 154 and circular buffer 152 are depicted in close proximity to each other on disk 150. This can allow for quicker updating of root area 154 or quicker access of data objects or metadata in circular buffer 152 since head 136 has less distance to travel between root area 154 and circular buffer 152. In other embodiments, root area 154 and circular buffer 152 may not be in close proximity to each other on disk 150. For example, in an embodiment where disk 150 is part of a disk pack, root area 154 and circular buffer 152 may be on different disk surfaces accessed by different heads 136. In another embodiment, root area 154 may be located in solid-state memory 128.

In addition to disk 150, the NVM media of DSD 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

As with SMR portions of disk 150, solid-state memory 128 may also use a logical to physical mapping for keeping track of the location of data. In this regard, solid-state memory 128 may use an indirection system to map data to various physical locations in the storage media of solid-state memory 128 to provide for wear leveling. Such wear leveling can ordinarily prolong the service life of solid-state memory 128 by providing a more even usage of the storage media in solid-state memory 128. However, the indirection system of solid-state memory 128 generates additional metadata such as a logical to physical mapping that can be stored in translation table 22.

Volatile memory 140 can include, for example, a Dynamic Random Access Memory (DRAM), which can be used by DSD 106 to temporarily store data. Data stored in volatile memory 140 can include data read from NVM media (e.g., disk 150 or solid-state memory 128), data to be written to NVM media, instructions loaded from firmware of DSD 106 for execution by controller 120, or data used in executing firmware of DSD 106.

As shown in the embodiment of FIG. 1, volatile memory 140 stores translation table 22, which can provide a mapping between logical addresses (e.g., Logical Block Addresses (LBAs)) used by host 101 and physical locations (e.g., Physical Block Addresses (PBAs)) indicating physical locations on disk 150 or in solid-state memory 128. As discussed in more detail below, a back-up copy of translation table 22 or a portion of translation table 22 is stored in circular buffer 152. The circular buffer 152 is updated to account for changes to translation table 22 as stored in volatile memory 140. In other embodiments, circular buffer 152 may store other data objects or metadata in addition to or without translation table 22.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be stored in solid-state memory 128, controller 120 receives data from host interface 126 and may buffer the data in volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101. Such data may be buffered by controller 120 before transferring the data to host 101 via host interface 126.

For data to be written to disk 150, controller 120 can encode the buffered data into write signal 32 which is provided to head 136 for magnetically writing data to the surface of disk 150.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data is buffered in volatile memory 140 for transferring to host 101.

Translation Table Example

Figures 2, 3:
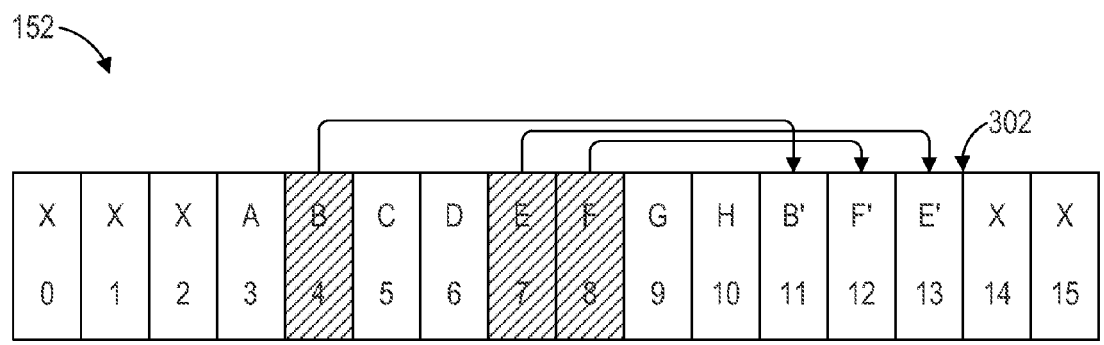
FIG. 2 is a conceptual diagram illustrating an example of blocks of metadata according to an embodiment.
FIG. 3 illustrates an example of a circular buffer storing blocks of metadata according to an embodiment.

FIG. 2 is a conceptual diagram illustrating an example of blocks of metadata according to an embodiment. In the example of FIG. 2, translation table 22 has been logically divided into blocks A to H of metadata. Each of blocks A to H represent data stored in DSD 106 that is associated within a range of LBAs from translation table 22 as shown in FIG. 2. Although not shown in FIG. 2, translation table 22 can also include PBAs, ranges of PBAs, or PBA offsets associated with each LBA range.

In different embodiments, other metadata besides translation table 22 may be logically divided into blocks of metadata. Such metadata may include, for example, information indicating a structure, history, or contents of data or can indicate an environmental condition or state of the storage media.

In addition, FIG. 2 includes an indication of whether or not a change has been made in a particular block of metadata. In the example of FIG. 2, a flag indicating whether a change has been made for each block may be stored as a part of translation table 22 in volatile memory 140 or may be kept in another location such as in solid-state memory 128. As shown in FIG. 2, changes have been made to blocks B, E, and F, as indicated by their flags being set to "1." These changes may result from the performance of write commands or maintenance operations for data in the range of LBAs associated with the block. The flags may be reset to "0" after the metadata for the changed blocks of metadata have been stored to non-volatile memory (i.e., check-pointed). Other embodiments may use a different indication of whether a particular block has changed since a last check-pointing of the metadata.

As discussed in more detail below, by keeping track of the portions of translation table 22 that have changed, it is ordinarily possible to reduce the time and resources needed to check-point or store translation table 22 to non-volatile memory such as disk 150 or solid-state memory 128. This can be accomplished by only check-pointing or storing the portions of translation table 22 that have changed without having to check-point or store all of translation table 22. As the amount of data stored in DSD 106 increases, the size of translation table 22 generally increases to account for the locations of the data and the advantage of only saving the changed blocks becomes more significant.

Check-Pointing Examples

FIG. 3 illustrates an example of circular buffer 152 storing blocks A to H of metadata from FIG. 2 in respective blocks 3 to 13 of circular buffer 152 according to an embodiment. Writing in circular buffer 152 can begin at one block in circular buffer 152 and continue sequentially until the end of circular buffer 152 is reached before resuming writing back at the beginning of circular buffer 152.

Data objects A to H can include data objects or metadata that is stored in volatile memory 140 that is changed during the operation of DSD 106. One example of such data, can include translation table 22 or portions of translation table 22. In this example, translation table 22 may be updated with new physical addresses when data is rewritten on disk 150 or solid-state memory 128. Translation table 22 is updated in volatile memory 140 and changed blocks of translation table 22 are later stored in circular buffer 152 to provide locations of data upon a startup of DSD 106.

As shown in FIG. 3, updated or changed blocks B, E, and F are rewritten in circular buffer 152 so as to follow a sequential writing of circular buffer 152 in accordance with SMR. In this regard, updated or changed blocks of metadata can be written at head location 302 in circular buffer 152. The cross-hatched versions of blocks B, E, and F indicate a previous version of a metadata block stored at circular buffer blocks 4, 7, and 8, respectively. Although FIG. 3 depicts one example order for rewriting a more recent version of metadata blocks B, F, and E, the particular locations or order of rewriting the blocks can vary.

To keep track of the new locations of the metadata, controller 120 can update mapping data in root area 154 to identify the new locations for metadata blocks B', E', and F'. As noted above, root area 154 can be located on disk 150 as in the embodiment of FIG. 1, or root area 154 may be located in a different storage media such as solid-state memory 128. An example of mapping data stored in root area 154 can be found in co-pending U.S. patent application Ser. No. 14/335,539, filed on Jul. 18, 2014, which is hereby incorporated by reference in its entirety.

The writing of circular buffer 152 continues until block 15 has been written and then writing returns to circular buffer block 0 and advances toward the end of circular buffer 152.

Free space in circular buffer 152 is indicated with X's in blocks 0 to 2 and in blocks 14 and 15. The free space in circular buffer 152 can include previous versions of metadata, such as previous versions of metadata blocks A to H, or empty blocks without data. In other embodiments, the number of circular buffer blocks and metadata blocks stored in circular buffer 152 may differ.

In the example of FIG. 3, circular buffer 152 is sized so as to allow enough space to store a previous version of data objects A to H in addition to the most recent version of data objects A to H. In other words, the size of circular buffer 152 is at least twice the size needed to store data objects A to H. The use of SMR in circular buffer 152 can make such redundancy more practical in terms of available space on disk 150. Circular buffer 152 may also include additional space for overprovisioning or for providing boundary buffers between circular buffer 152 and zones outside of circular buffer 152 on disk 150.

In addition, each of the blocks in circular buffer 152 can be the same size so as to facilitate the relocation of data from one of blocks 0 to 15 to any of the other blocks in circular buffer 152. Controller 120 may pad data or increase a size of data to be stored in circular buffer 152 in order to meet a modular size for each of blocks 0 to 18.

Figure 4:
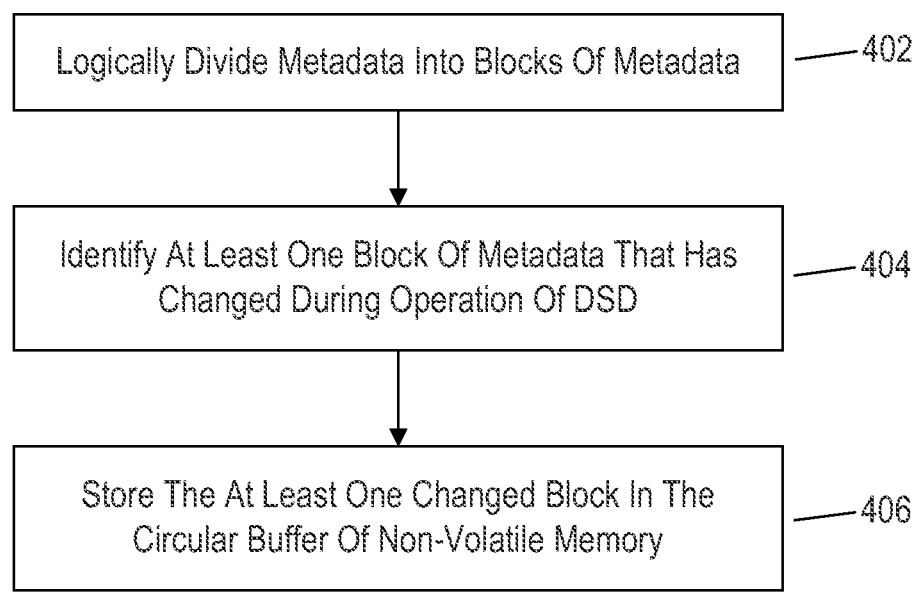
FIG. 4 is a flowchart for a metadata check-pointing process according to an embodiment.

FIG. 4 is a flowchart for a metadata check-pointing process that can be performed by controller 120 according to an embodiment. The process of FIG. 4 can be performed, for example, by controller 120 executing a firmware of DSD 106 or computer-executable instructions stored in volatile memory 140.

In block 402, controller 120 logically divides metadata stored in volatile memory 140 into blocks of metadata. In the example of FIG. 2, this can include dividing translation table 22 into ranges of LBAs.

In block 404, controller 120 identifies at least one block of metadata that has changed during operation of DSD 106. The identification of block 404 may be accomplished through the use of flags as in the example of FIG. 2 or through a different indication that a block has changed since a last check-pointing of the metadata.

In block 406, controller 120 stores the at least one changed block in circular buffer 152 to check-point the changed metadata. By only storing the changed blocks of metadata, it is ordinarily possible to reduce the time and required resources to check-point the metadata.

Figure 5:
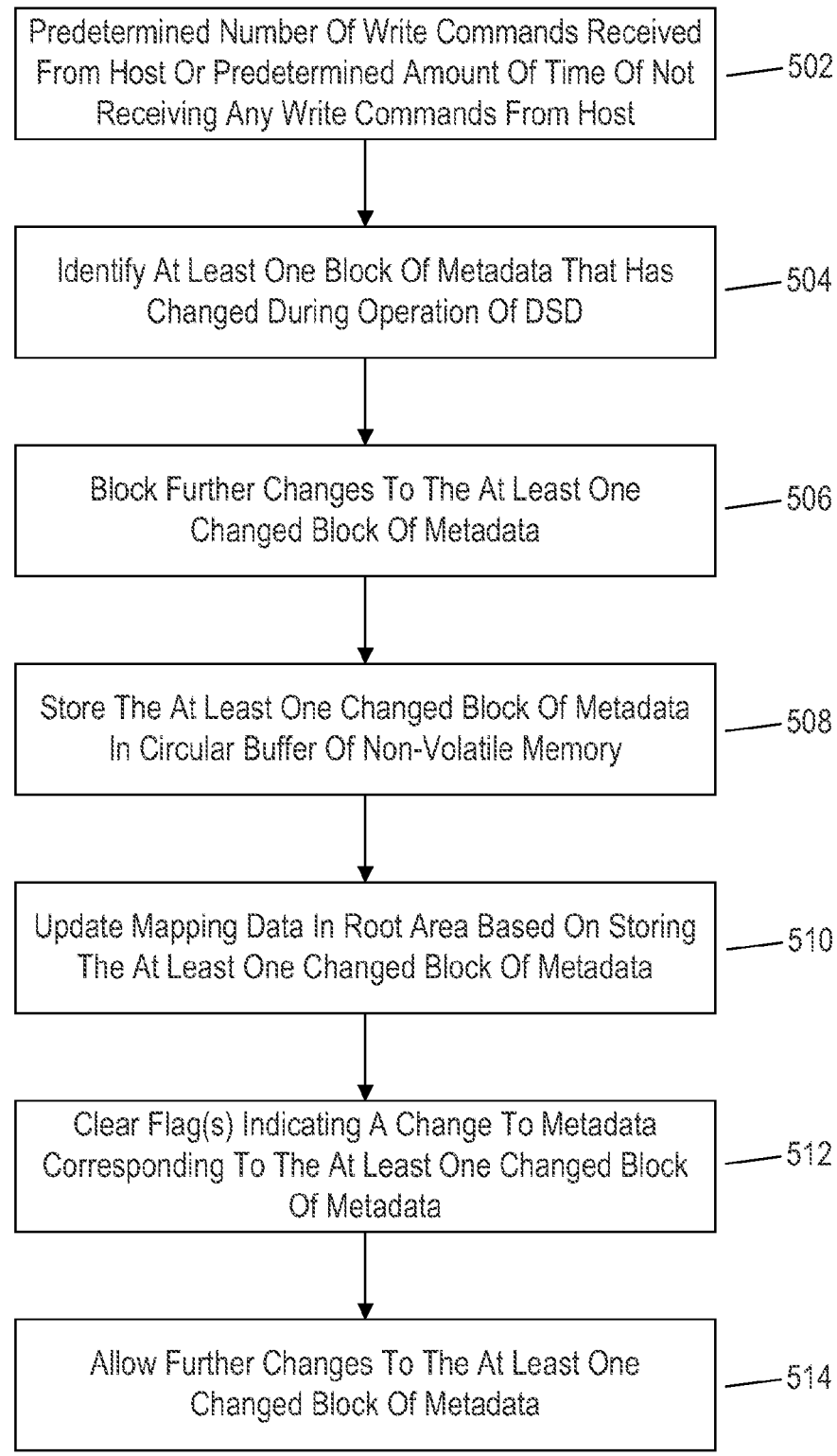
FIG. 5 is a flowchart for a metadata check-pointing process according to another embodiment.

FIG. 5 is a flowchart for a metadata check-pointing process that can be performed by controller 120 according to an embodiment. The process of FIG. 5 can be performed, for example, by controller 120 executing a firmware of DSD 106 or computer-executable instructions stored in volatile memory 140.

In block 502, controller 120 counts a predetermined number of write commands received from host 101 or waits a predetermined amount of time since not receiving any read or write commands from host 101. In this way, the check-pointing of the metadata can take place after there have been a certain number of changes to the metadata stored in volatile memory 140 or if there is an idle time when DSD 106 is not otherwise servicing read and write commands from host 101.

In block 504, controller 120 identifies at least one block of metadata that has changed during operation of DSD 106. The identification of block 504 may be accomplished through the use of flags as in the example of FIG. 2 or through a different indication that a block has changed since a last check-pointing of the metadata.

In block 506, controller 120 ensures coherency between the at least one changed block of metadata stored in volatile memory 140 and the copy of the at least one changed block being stored in circular buffer 152. In the embodiment of FIG. 5, controller 120 blocks further changes to the at least one changed block of metadata identified in block 504. In other words, changes to the metadata stored in volatile memory 140 are prevented while the metadata is being check-pointed. In one example implementation, performance of a write command can be deferred by temporarily storing the data for the write command in volatile memory 140 until the block of metadata becomes available for changes. In another example, controller 120 may account for changes to be made to the metadata while it is check-pointed and then later update the metadata in volatile memory 140 after check-pointing.

In block 508, controller 120 stores the at least one changed block of metadata in circular buffer 152. When writing the at least one changed block of metadata in circular buffer 152, controller 120 may write the at least one changed block of metadata sequentially in a next available circular buffer block to allow for SMR in circular buffer 152. By using SMR in circular buffer 152, it is ordinarily possible to save space on disk 150 and in some embodiments to simplify operation of DSD 106 by not having to manage both non-overlapping tracks in Conventional Magnetic Recording (CMR) zones and overlapping tracks in SMR zones. In other words, sequential writing in circular buffer 152 can in some embodiments allow controller 120 to treat all of disk 150 similarly as SMR zones.

In block 510, controller 120 updates mapping data in root area 154 to account for storing the at least one changed block of metadata in block 508. As discussed above, the mapping data in root area 154 can identify locations in circular buffer 152 for the metadata or data objects stored in circular buffer 152. In the example where the metadata stored in circular buffer 152 is from translation table 22, the mapping data of root area 154 can be used upon startup of DSD 106 to locate metadata used to rebuild translation table 22 in volatile memory 140 or to recover a previous version of translation table 22.

In block 512, controller 120 clears flags indicating changes to the at least one changed block of metadata stored in block 508. This resets the status of the blocks of metadata to allow for the identification of changed blocks in a subsequent iteration of the metadata check-pointing process.

In block 514, controller 120 allows changes to once again be made to the at least one changed block of metadata.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
a volatile memory for storing metadata;
a non-volatile memory including a disk; and
a controller configured to:
logically divide the metadata into blocks of metadata;
identify at least one changed block of metadata that has changed during operation of the DSD; and
store the at least one changed block of metadata in a circular buffer in overlapping tracks on the disk.

2. The DSD of claim 1, wherein the metadata includes a translation table associating logical block addresses for data stored in the DSD with physical block addresses identifying locations where the data is stored in the DSD.

3. The DSD of claim 1, wherein the controller is further configured to:
receive write commands from a host to store data in the DSD; and
store the at least one changed block of metadata in the circular buffer after receiving a predetermined number of write commands from the host.

4. The DSD of claim 1, wherein the controller is further configured to:
receive write commands from a host to store data in the DSD; and
store the at least one changed block of metadata in the circular buffer after a predetermined amount of time of not receiving any write commands from the host.

5. The DSD of claim 1, wherein the non-volatile memory includes a solid-state memory.

6. The DSD of claim 1, wherein the non-volatile memory further includes a root area for storing mapping data indicating a location of at least a portion of the metadata stored in the circular buffer.

7. The DSD of claim 6, wherein the controller is further configured to update the mapping data in the root area based on storing the at least one changed block of metadata in the circular buffer.

8. The DSD of claim 1, wherein the controller is further configured to ensure coherency between the at least one changed block of metadata stored in the volatile memory and the at least one changed block of metadata being stored in the circular buffer when storing the at least one changed block of metadata in the circular buffer.

9. The DSD of claim 8, wherein the controller is further configured to block further changes to the at least one changed block of metadata stored in the volatile memory when storing the at least one changed block of metadata in the circular buffer to ensure coherency between the at least one changed block of metadata stored in the volatile memory and the at least one changed block of metadata being stored in the circular buffer.

10. The DSD of claim 1, wherein the controller is further configured to identify the at least one changed block of metadata using at least one flag indicating a change to metadata corresponding to the at least one changed block of metadata.

11. A method for managing data stored in a Data Storage Device (DSD) comprising a volatile memory and a non-volatile memory including a disk, the method comprising:
logically dividing metadata stored in the volatile memory into blocks of metadata;
identifying at least one changed block of metadata that has changed during operation of the DSD; and
storing the at least one changed block of metadata in a circular buffer in overlapping tracks on the disk.

12. The method of claim 11, wherein the metadata includes a translation table associating logical block addresses for data stored in the DSD with physical block addresses identifying locations where the data is stored in the DSD.

13. The method of claim 11, further comprising:
receiving write commands from a host to store data in the DSD; and
storing the at least one changed block of metadata in the circular buffer after receiving a predetermined number of write commands from the host.

14. The method of claim 11, further comprising:
receiving write commands from a host to store data in the DSD; and
storing the at least one changed block of metadata in the circular buffer after a predetermined amount of time of not receiving any write commands from the host.

15. The method of claim 11, wherein the non-volatile memory includes a solid-state memory.

16. The method of claim 11, wherein the non-volatile memory further includes a root area for storing mapping data indicating a location of at least a portion of the metadata stored in the circular buffer.

17. The method of claim 16, further comprising updating the mapping data in the root area based on storing the at least one changed block of metadata in the circular buffer.

18. The method of claim 11, further comprising ensuring coherency between the at least one changed block of metadata stored in the volatile memory and the at least one changed block of metadata being stored in the circular buffer when storing the at least one changed block of metadata in the circular buffer.

19. The method of claim 18, further comprising blocking further changes to the at least one changed block of metadata stored in the volatile memory when storing the at least one changed block of metadata in the circular buffer to ensure coherency between the at least one changed block of metadata stored in the volatile memory and the at least one changed block of metadata being stored in the circular buffer.

20. The method of claim 11, further comprising identifying the at least one changed block of metadata using at least one flag indicating a change to metadata corresponding to the at least one changed block of metadata.

21. A computer readable storage medium storing computer-executable instructions for managing data stored in a Data Storage Device (DSD) comprising a volatile memory and a non-volatile memory including a disk, wherein when the computer-executable instructions are executed by a processor or controller, the computer-executable instructions cause the processor or controller to:
logically divide metadata stored in the volatile memory into blocks of metadata;
identify at least one changed block of metadata that has changed during operation of the DSD; and
store the at least one changed block of metadata in a circular buffer in overlapping tracks on the disk.

* * * * *